United States Patent
Xia et al.

(10) Patent No.: US 11,600,819 B2
(45) Date of Patent: Mar. 7, 2023

(54) POSITIVE ELECTRODE OF LITHIUM-ION BATTERY, ALL-SOLID-STATE LITHIUM-ION BATTERY AND PREPARATION METHOD THEREOF, AND ELECTRICAL DEVICE

(71) Applicants: Tianjin Ruisheng Huineng Technology Co., Ltd., Tianjin (CN); The Northern Research Institute of NJUST, Tianjin (CN)

(72) Inventors: Hui Xia, Nanjing (CN); Qiuying Xia, Nanjing (CN); Shuo Sun, Nanjing (CN); Feng Zan, Nanjing (CN); Jing Xu, Nanjing (CN); Jili Yue, Nanjing (CN)

(73) Assignee: THE NORTHERN RESEARCH INSTITUTE OF NJUST, Tianjin (CN)

( * ) Notice: Subject to any disclaimer, the term of this patent is extended or adjusted under 35 U.S.C. 154(b) by 176 days.

(21) Appl. No.: 16/652,764

(22) PCT Filed: May 13, 2019

(86) PCT No.: PCT/CN2019/086704
§ 371 (c)(1),
(2) Date: Apr. 1, 2020

(87) PCT Pub. No.: WO2020/048150
PCT Pub. Date: Mar. 12, 2020

(65) Prior Publication Data
US 2020/0235388 A1      Jul. 23, 2020

(30) Foreign Application Priority Data

Sep. 5, 2018   (CN) .......................... 201811034547.8

(51) Int. Cl.
H01M 4/50   (2010.01)
H01M 4/48   (2010.01)
(Continued)

(52) U.S. Cl.
CPC ......... *H01M 4/502* (2013.01); *H01M 4/0426* (2013.01); *H01M 4/139* (2013.01);
(Continued)

(58) Field of Classification Search
None
See application file for complete search history.

(56) References Cited

U.S. PATENT DOCUMENTS

| 2009/0068559 A1* | 3/2009 | Gamoh | H01M 4/131 |
| | | | 429/220 |
| 2011/0003212 A1* | 1/2011 | Sato | H01M 10/0585 |
| | | | 423/276 |

(Continued)

FOREIGN PATENT DOCUMENTS

| CN | 102301519 | 12/2011 |
| CN | 102290595 | 6/2014 |

(Continued)

OTHER PUBLICATIONS

JP2013062242 English translation. Yukinobu et al. Japan. Apr. 4, 2013. (Year: 2013).*

(Continued)

*Primary Examiner* — Christopher P Domone
(74) *Attorney, Agent, or Firm* — Hogan Lovells US LLP

(57) ABSTRACT

The present disclosure provides a positive electrode of lithium-ion battery, an all-solid-state lithium-ion battery and a preparation method thereof, and an electrical device. The all-solid-state lithium-ion battery of the present disclosure includes a positive electrode, a solid electrolyte, and a negative electrode; wherein the positive electrode includes a positive electrode current collector and a positive electrode material layer provided on a surface of the positive electrode current collector, a positive electrode active material in the positive electrode material layer is a manganese oxygen (Continued)

compound; and the negative electrode includes a negative electrode current collector and a negative electrode material layer provided on a surface of the negative electrode current collector, a negative electrode active material in the negative electrode material layer is a titanium oxygen compound.

17 Claims, 9 Drawing Sheets

(51) Int. Cl.
*H01M 4/139* (2010.01)
*H01M 4/04* (2006.01)
*H01M 10/0525* (2010.01)
*H01M 10/0562* (2010.01)

(52) U.S. Cl.
CPC ....... *H01M 4/483* (2013.01); *H01M 10/0525* (2013.01); *H01M 10/0562* (2013.01); *H01M 2300/008* (2013.01); *H01M 2300/0071* (2013.01)

(56) References Cited

U.S. PATENT DOCUMENTS

| | | | | |
|---|---|---|---|---|
| 2011/0287296 | A1* | 11/2011 | Sabi | H01M 6/40 429/127 |
| 2019/0252682 | A1* | 8/2019 | Takeuchi | H01M 10/0525 |
| 2021/0234155 | A1* | 7/2021 | Jeong | H01M 4/134 |

FOREIGN PATENT DOCUMENTS

| | | |
|---|---|---|
| CN | 104157905 | 11/2014 |
| CN | 106207099 | 12/2016 |
| CN | 109148894 | 1/2019 |
| JP | 2013062242 | * 4/2013 |
| WO | 2018097727 | 5/2018 |

OTHER PUBLICATIONS

International Search Report and Written Opinion issued in International Application No. PCT/CN2019/086704 dated Aug. 8, 2019.
Xia et al., "Manganese Oxide Thin Films Prepared by Pulsed Laser Deposition for Thin Film Microbatteries", Materials Chemistry and Physics, vol. 143, pp. 720-727, 2014.
Vanhoutte et al., "Electro-Precipitation Via Oxygen Reduction: A New Technique for Thin Film Manganese Oxide Deposition", Journals of Materials Chemistry A, vol. 4, pp. 13555-13562, 2016.
Mattelaer et al., "Deposition of MnO Anode and MnO2 Cathode Thin Films by Plasma Enhanced Atomic Layer Deposition Using the Mn(thd)3 Precursor", Chemistry of Materials, vol. 27, Issue 10, pp. 3628-3635, 2015.
WikipediA entry for "Thin-film lithium-ion battery," https://en.wikipedia.org/w/index.php?title=Thin-film_lithium-ion_battery&oldid=1070312873 (2022).

* cited by examiner

POSITIVE ELECTRODE OF LITHIUM-ION BATTERY, ALL-SOLID-STATE LITHIUM-ION BATTERY AND PREPARATION METHOD THEREOF, AND ELECTRICAL DEVICE

CROSS-REFERENCE TO RELATED APPLICATIONS

The present disclosure is a national stage 35 U.S.C. 371 application of PCT application no. PCT/CN2019/086704, entitled "Positive Electrode of Lithium-ion Battery, All-solid-state Lithium-ion Battery and Preparation Method Thereof, and Electrical Device," filed on May 13, 2019, which claims priority to Chinese patent application No. 201811034547.8, filed with the Chinese Patent Office on Sep. 5, 2018 and entitled "Positive Electrode of Lithium-ion Battery, All-solid-state Lithium-ion Battery and Preparation Method Thereof, and Electrical Device", the contents of which are incorporated herein by reference in their entirety.

TECHNICAL FIELD

The present disclosure relates to the technical field of batteries, and particularly to a positive electrode of lithium-ion battery, an all-solid-state lithium-ion battery and a preparation method thereof, and an electrical device.

BACKGROUND ART

Due to the various advantages such as high operating voltage, high energy density, long cycle life and no memory effect, lithium-ion batteries are widely used in the fields such as consumer electronics, power tools, medical electronics, electric vehicles, rail traffic, aerospace, large-scale renewable energy source access, peak-load regulation and frequency regulation of power grid and distributed energy storage. However, due to the use of a liquid organic electrolyte, the current commercial lithium-ion batteries have the characteristic of being susceptible to combustion, explosion and volatilization, and safety accidents have occurred frequently in recent years. Using a solid electrolyte instead of the liquid organic electrolyte and preparing all-solid-state thin-film batteries can fundamentally solve the safety problem of lithium-ion batteries. The current types of solid-state batteries are difficult to achieve commercialized application at present due to electrode/electrolyte interface problems and insufficiently mature technology. To thin the solid-state batteries and prepare all-solid-state thin-film lithium-ion batteries can realize a relatively perfect electrode/electrolyte interface, which is the form of solid-state batteries that have been commercialized at present.

An all-solid-state thin-film lithium-ion battery is prepared by sequentially preparing the individual elements of a battery into a thin film on an electrically conductive substrate in the order of a positive electrode, an electrolyte and a negative electrode, and then packaging the same to form an integral battery, and the working principle thereof is similar to that of a commercial lithium-ion battery. Compared with a commercial lithium-ion battery using a liquid electrolyte, the all-solid-state thin-film lithium-ion battery has the characteristics of high energy density, excellent electrical performance, etc., and has a high battery packaging efficiency, which enables the battery to be widely used in various microelectronic devices.

In the existing all-solid-state thin-film lithium-ion batteries, the required positive electrode materials most need to be subjected to a high-temperature annealing treatment, which, however, will cause cracking and exfoliation of the positive electrode active material thin film, resulting in the formation of a micro-short circuit of the thin-film batteries. Moreover, the high temperature process is not matched with the semi-conductor process, making it difficult to realize the integration of the solid-state thin-film battery on a microcircuit, and also making it difficult to prepare the battery on a non-high-temperature resistant substrate. Furthermore, the all-solid-state thin-film lithium-ion batteries use negative electrode materials that often have poor resistance to the environment, and therefore can hardly be integrated in an integrated circuit, have tough requirements for the production environment, and also can hardly be used in high-temperature places. In view of this, there is proposed the present disclosure.

SUMMARY

The objects of the present disclosure include providing a positive electrode of lithium-ion battery to solve the technical problem that the existing positive electrodes suitable for all-solid-state lithium-ion batteries are prone to cracking and exfoliation under high-temperature annealing conditions, can hardly be integrated with microcircuits and are not easy to combine with non-high-temperature resistant, soluble substrates.

The objects of the present disclosure further include providing an all-solid-state lithium-ion battery to solve the technical problems of being difficult to integrate in an integrated circuit, having tough requirements for the production environment, being difficult to use in high-temperature places, etc., in the existing solid-state lithium-ion batteries having lithium-containing positive and negative electrodes.

The objects of the present disclosure further include providing a preparation method of the all-solid-state lithium-ion battery.

The objects of the present disclosure further include providing an electrical device comprising the above all-solid-state lithium-ion battery.

In order to achieve at least one of the objects of the present disclosure, the following technical solutions are employed:

A positive electrode of lithium-ion battery, comprising a positive electrode current collector and a positive electrode material layer provided on a surface of the positive electrode current collector, wherein a positive electrode active material in the positive electrode material layer is a manganese oxygen compound; preferably, the manganese oxygen compound includes one of manganese dioxide, manganese sesquioxide and manganous-manganic oxide or a complex of more than one therefrom.

An all-solid-state lithium-ion battery, comprising a positive electrode, a solid electrolyte and a negative electrode; wherein the positive electrode comprises a positive electrode current collector and a positive electrode material layer provided on a surface of the positive electrode current collector, a positive electrode active material in the positive electrode material layer is a manganese oxygen compound; the negative electrode material comprises a negative electrode current collector and a negative electrode material layer provided on a surface of the negative electrode current collector, a negative electrode active material in the negative electrode material layer is a titanium oxygen compound; preferably, the manganese oxygen compound includes one of manganese dioxide, manganese sesquioxide and manganous-manganic oxide or a complex of more than one therefrom; more preferably, the positive electrode material layer is a manganese oxygen compound thin film; preferably, the titanium oxygen compound includes titanium dioxide; and more preferably, the negative electrode material layer is a titanium oxygen compound thin film.

A preparation method of the all-solid-state lithium-ion battery, comprising: combining a positive electrode, a solid electrolyte and a negative electrode in sequence to obtain an all-solid-state lithium-ion battery.

An electrical device, wherein the electronic device comprises the all-solid-state lithium-ion battery described in the present disclosure.

Compared with the prior art, the present disclosure has the advantageous effects, for example, including the followings:

(1) The all-solid-state lithium-ion battery of the present disclosure can be used in an ultra-high temperature range, and the highest use temperature can reach 300° C., which can expand the application of the all-solid-state thin-film lithium-ion battery to aerospace or high-temperature places.

(2) The requirements of the all-solid-state lithium-ion battery of the present disclosure for the preparation site are greatly lowered, which can improve the success rate of battery preparation.

(3) The preparation of the all-solid-state lithium-ion battery of the present disclosure does not require a high-temperature treatment process, which can simplify the preparation process and reduce the preparation cost, and can also be matched with the semiconductor process to realize the integration of the solid-state thin-film battery on a microcircuit.

(4) The all-solid-state lithium-ion battery of the present disclosure can be prepared on various substrates, not only including conventional high-temperature resistant stainless steel, aluminum oxide, silicon wafers and glass sheet substrates, but also including lightweight, non-high-temperature resistant paper, polymers (e.g., polyimide), etc., and enables the development of unique all-solid-state "paper batteries".

BRIEF DESCRIPTION OF DRAWINGS

In order to more clearly illustrate the technical solutions of the specific embodiments of the present disclosure or in the prior art, brief description is made below on the drawings required to be used in the description of the specific embodiments or the prior art. Obviously, the drawings described below illustrate some of the embodiments of the present disclosure, and for a person of ordinary skills in the art, other drawings may be obtained from these drawings without inventive effort.

Figure 1:
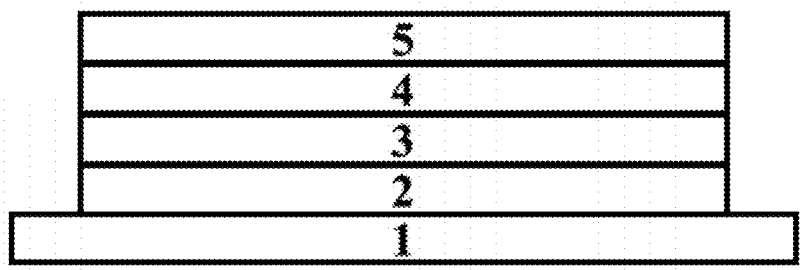
FIG. 1 is a schematic structural diagram of an all-solid-state thin-film lithium-ion battery prepared in Example 1 of the present disclosure.
Figure 2:
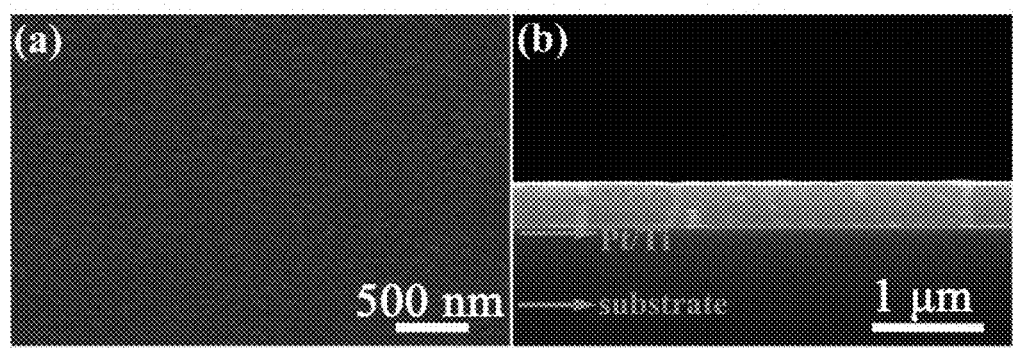
FIG. 2 is an SEM image of a $Mn_3O_4$ positive electrode thin film prepared in Example 1 of the present disclosure.
Figure 3:
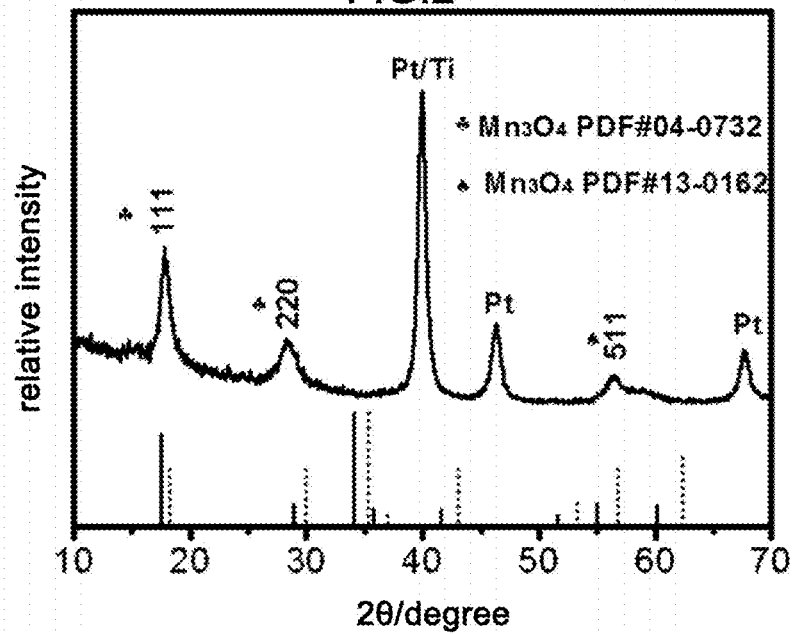
FIG. 3 is a Raman diagram of the $Mn_3O_4$ positive electrode thin film prepared in Example 1 of the present disclosure.
Figure 4:
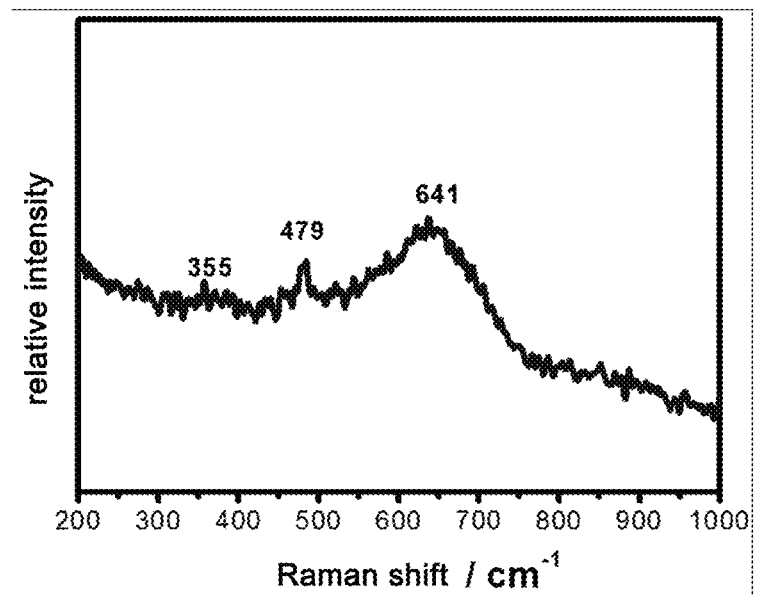
FIG. 4 is a Raman diagram of the $Mn_3O_4$ positive electrode thin film prepared in Example 1 of the present disclosure.
Figure 5:
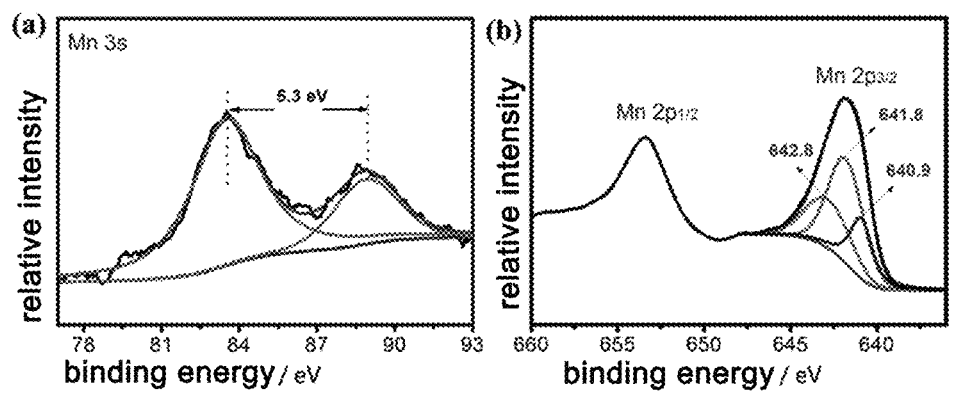
FIG. 5 is an XPS diagram of the $Mn_3O_4$ positive electrode thin film prepared in Example 1 of the present disclosure.
Figure 6:
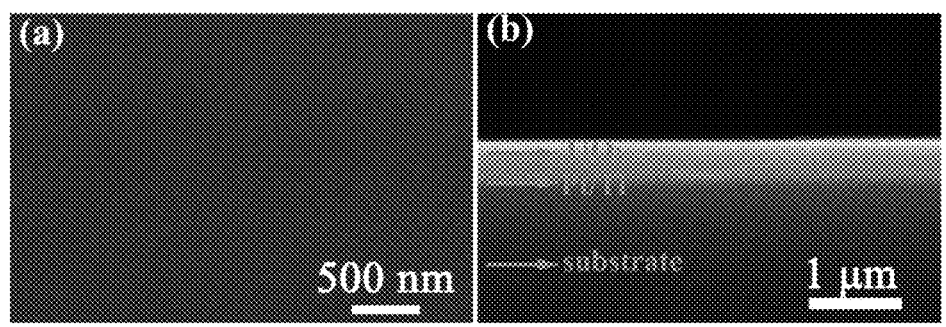
FIG. 6 is an SEM image of a $TiO_2$ thin film prepared in Example 1 of the present disclosure.
Figure 10:
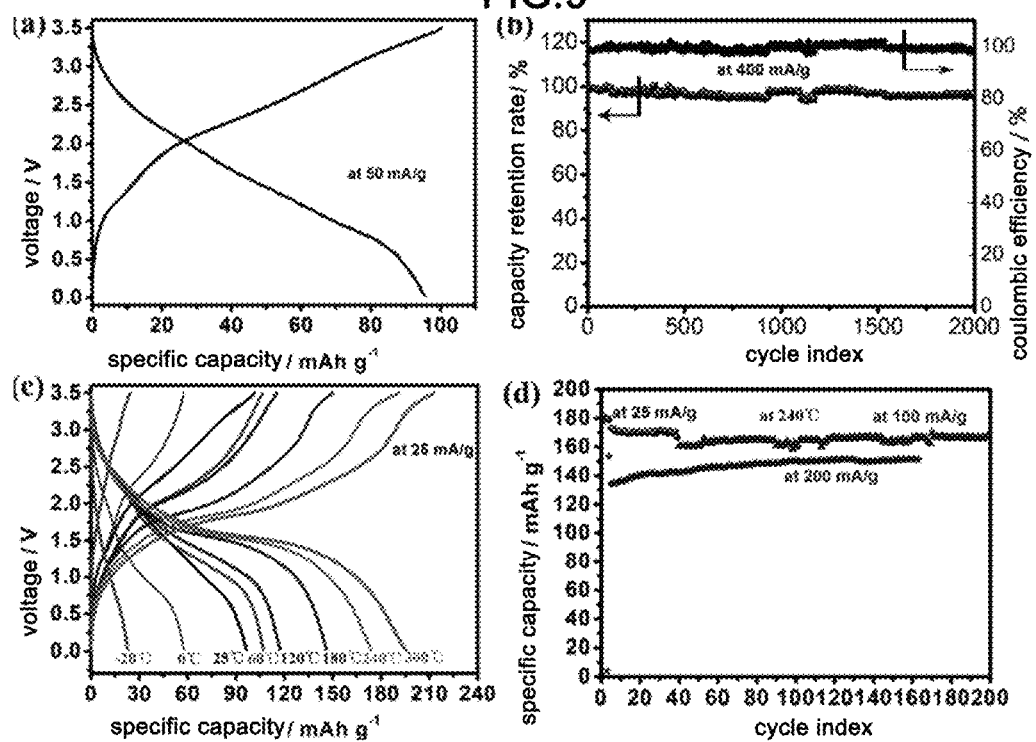
FIG. 10 is a performance detection diagram of a $Mn_3O_4$/LiPON/$TiO_2$ all-solid-state thin-film lithium-ion battery prepared in Example 1 of the present disclosure.
Figure 11:
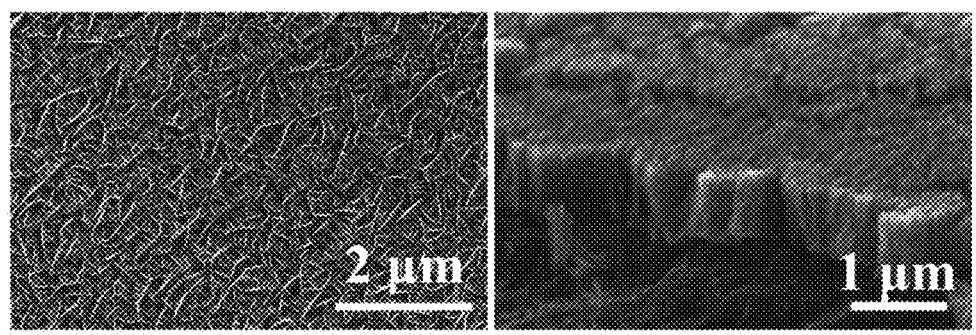
FIG. 11 is an SEM image of a $MnO_x$ amorphous thin film prepared in Example 2 of the present disclosure.
Figure 16:
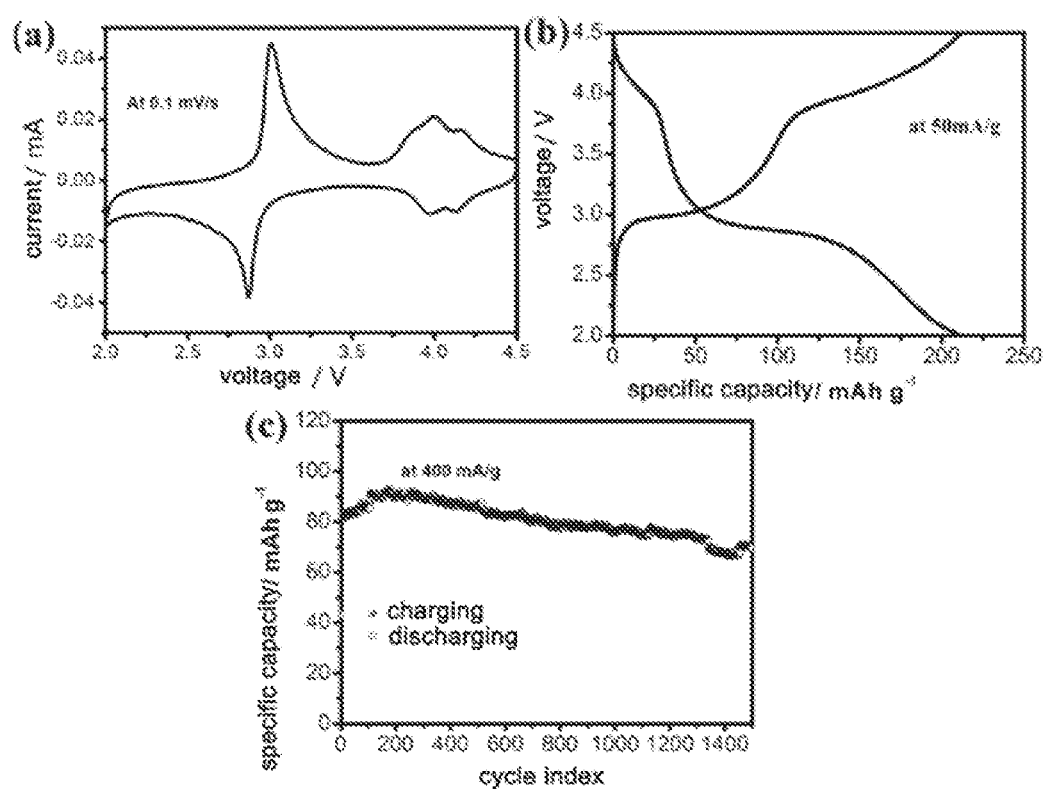
FIG. 16 is an electrochemical performance diagram of an all-solid-state thin-film lithium-ion battery prepared in Comparative Example 1 of the present disclosure.
Figure 17:
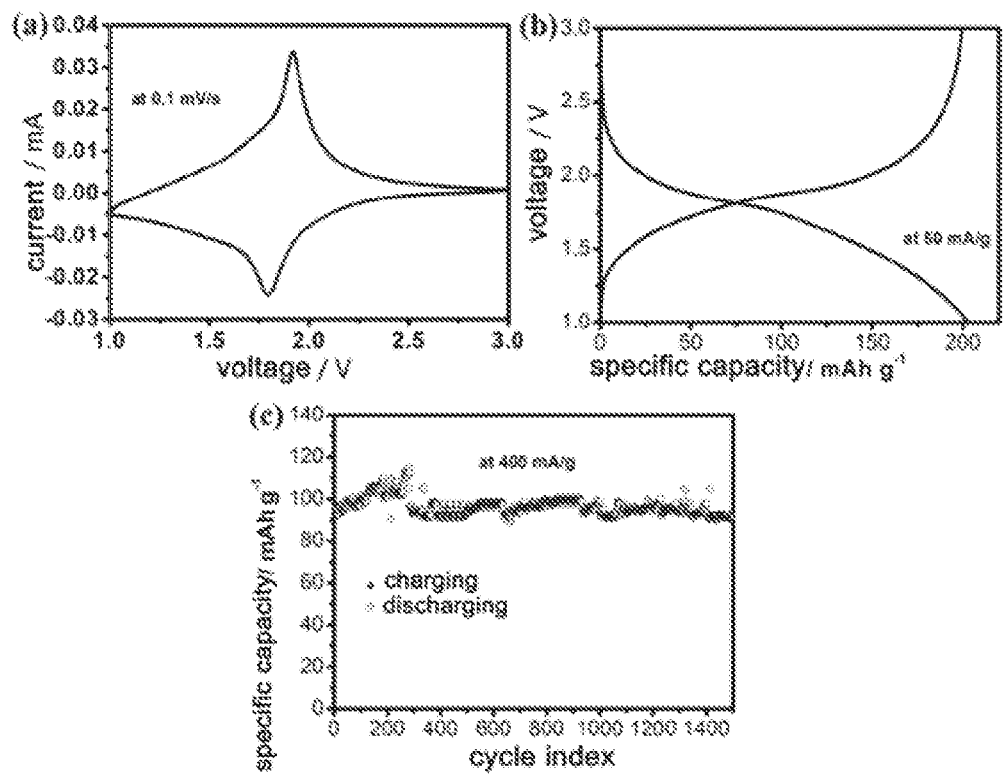
FIG. 17 is an electrochemical performance diagram of an all-solid-state thin-film lithium-ion battery prepared in Comparative Example 2 of the present disclosure.

In the above, in FIG. 1, 1—positive electrode current collector, 2—positive electrode material layer, 3—solid electrolyte layer, 4—negative electrode material layer, and 5—negative electrode current collector;

in FIG. 2, (a) is a 500 nm scale SEM image, and (b) is a 1 μm scale SEM image;

in FIG. 5, (a) is a Mn 3s XPS diagram, and (b) is a Mn 2p XPS diagram;

in FIG. 6, (a) is a 500 nm scale SEM image, and (b) is a 1 μm scale SEM image;

in FIG. 10, (a) is a charging/discharging graph at room temperature, (b) is a cycle performance graph at room temperature, (c) is a charging/discharging graph at different temperatures, and (d) is a charging/discharging graph at 240° C.;

in FIG. 11, (a) is a 2 μm scale SEM image, and (b) is a 1 μm scale SEM image;

in FIG. 16, (a) is a CV graph, (b) is a charging/discharging graph, and (c) is a cycle performance graph; and in FIG. 17, (a) is a CV graph, (b) is a charging/discharging graph, and (c) is a cycle performance graph.

DETAILED DESCRIPTION OF EMBODIMENTS

The embodiments of the present disclosure will be described in detail below in connection with examples. However, a person skilled in the art would appreciate that the following examples are only used to explain the present disclosure and should not be considered as limiting the scope of the present disclosure. Examples are carried out in accordance with conventional conditions or conditions recommended by the manufacturer if no specific conditions are specified in the examples. Reagents or instruments used, whose manufacturers are not specified, are all conventional products that are available commercially.

In one aspect, the present disclosure provides a positive electrode of lithium-ion battery, comprising a positive electrode current collector and a positive electrode material layer provided on a surface of the positive electrode current collector, a positive electrode active material in the positive electrode material layer being a manganese oxygen compound.

In the positive electrode of lithium-ion battery provided by the present disclosure, a manganese oxygen compound is used as the positive electrode active material of the lithium-ion battery. Compared with a lithium-containing positive electrode material, the manganese oxygen compound can be annealed below 400° C., and has relatively high crystallinity or can maintain good electrochemical performance without the need of annealing crystallization. Therefore, using a manganese oxygen compound as the positive electrode active material has the advantages of low required preparation temperature and low preparation cost, and enabling preparation on a non-high-temperature resistant, highly flexible substrate (for example, aluminum foils, paper, polymers, etc.). Further, with the positive electrode of lithium-ion battery, the all-solid-state lithium-ion battery can be matched with the semiconductor process and used to fabricate an integrated circuit.

In some embodiments of the present disclosure, the manganese oxygen compound includes one of manganese dioxide, manganese sesquioxide and manganous-manganic oxide or a complex of more than one therefrom;

preferably, the manganese dioxide, manganese sesquioxide and manganous-manganic oxide are each independently and optionally of a crystalline or amorphous structure.

In some embodiments of the present disclosure, in addition to the positive electrode active material, the positive electrode material layer may further comprise a binder, a conductive agent, or other substances improving the performance of the manganese oxygen compound; alternatively, the positive electrode material layer comprises only a positive electrode active material.

In some preferred embodiments of the present disclosure, the positive electrode material layer comprises only a positive electrode active material, i.e., the positive electrode material layer is a manganese oxygen compound thin film;

wherein the manganese oxygen compound is optionally present in crystalline or amorphous form in the manganese oxygen compound thin film.

In a second aspect, the present disclosure provides an all-solid-state lithium-ion battery, comprising a positive electrode, a solid electrolyte and a negative electrode;

wherein the positive electrode comprises a positive electrode current collector and a positive electrode material layer provided on a surface of the positive electrode current collector, a positive electrode active material in the positive electrode material layer is a manganese oxygen compound;

the negative electrode material comprises a negative electrode current collector and a negative electrode material layer provided on a surface of the negative electrode current collector, and a negative electrode active material in the negative electrode material layer is a titanium oxygen compound.

That is, the present disclosure provides an all-solid-state lithium-ion battery having a structure of a positive electrode current collector (layer), a positive electrode material layer, a solid electrolyte (layer), a negative electrode material layer and a negative electrode current collector (layer) in the above order.

The lithium-containing materials, such as $LiCoO_2$ materials, are the most commonly used positive electrode thin-film materials in all-solid-state thin-film lithium-ion batteries at present. However, the lithium-containing positive electrode materials can obtain relatively high crystallinity and ensure their excellent electrochemical performance usually only after high-temperature annealing (e.g., $LiCoO_2$ requires high-temperature annealing at 500° C. or above). However, on the one hand, the high-temperature annealing process will easily cause cracking and exfoliation of the positive electrode active material thin film, resulting in the formation of micro-short circuit in the thin-film battery; and on the other hand, the high temperature process is not matched with the semiconductor process, making it difficult to realize the integration of the solid-state thin-film battery on a microcircuit. In addition, the high-temperature annealing process also makes it difficult to prepare all-solid-state thin-film lithium-ion batteries on some non-high-temperature resistant, low-cost and highly flexible substrates (e.g., polyimide, aluminum foils, etc.). Moreover, for the commonly used negative electrode metal Life material, since it has a relatively low melting point (180° C.) and is liable to fail by absorbing water or oxygen, the battery with a lithium metal negative electrode is difficult to integrate in an integrated circuit (the welding temperature during integration is typically above 180° C.), has tough requirement for production environment (which needs to be prepared in a glove box or a high-level ultra-clean room), and can hardly be used in high temperature places (which typically can only be used at a temperature below 180° C.).

In the all-solid-state lithium-ion battery provided by the present disclosure, neither the positive electrode nor the negative electrode contains a lithium compound or lithium metal, and since both the manganese oxygen compound and the titanium oxygen compound can be prepared at room temperature or at a relatively low temperature (lower than 400° C.), the requirements of the all-solid-state lithium-ion battery of the present disclosure for the preparation environment conditions are greatly reduced, which can also be matched with the semiconductor process, and the integration of the solid-state battery on a microcircuit can be realized.

In some embodiments of the present disclosure, in the all-solid-state lithium-ion battery, the manganese oxygen compound includes one of manganese dioxide, manganese sesquioxide and manganous-manganic oxide or a complex of more than one therefrom;

preferably, the manganese dioxide, manganese sesquioxide and manganous-manganic oxide are each independently and optionally crystalline or amorphous.

In some embodiments of the present disclosure, in the all-solid-state lithium-ion battery, in addition to the positive electrode active material, the positive electrode material layer may further comprise a binder, a conductive agent, or other substances improving the performance of the manganese oxygen compound; alternatively, the positive electrode material layer comprises only a positive electrode active material.

In some preferred embodiments of the present disclosure, in the all-solid-state lithium-ion battery, the positive electrode material layer comprises only a positive electrode active material, i.e., the positive electrode material layer is a manganese oxygen compound thin film;

wherein the manganese oxygen compound is optionally present in crystalline or amorphous form in the manganese oxygen compound thin film.

In some embodiments of the present disclosure, in the all-solid-state lithium-ion battery, the titanium oxygen compound includes titanium dioxide;

preferably, the titanium dioxide is optionally a crystalline or amorphous compound of nitrogen-doped or non-nitrogen-doped titanium dioxide.

In some embodiments of the present disclosure, in the all-solid-state lithium-ion battery, in addition to the negative electrode active material, the negative electrode material layer may further comprise a binder, a conductive agent, or other substances improving the performance of the titanium oxygen compound; alternatively, the negative electrode material layer comprises only a negative electrode active material.

In some preferred embodiments of the present disclosure, in the all-solid-state lithium-ion battery, the negative electrode material layer comprises only a negative electrode active material, i.e., the negative electrode material layer is a titanium oxygen compound thin film;

wherein in the titanium oxygen compound thin film, the titanium oxygen compound is optionally present in crystalline or amorphous form, preferably in the form of a crystalline or amorphous compound of nitrogen-doped or non-nitrogen-doped titanium dioxide.

In some embodiments of the present disclosure, in the all-solid-state lithium-ion battery, the solid electrolyte is a lithium-containing compound.

In some preferred embodiments of the present disclosure, in the all-solid-state lithium-ion battery, the solid electrolyte is selected from a group consisting of LiPON, LiSiON, $Li_2SiO_3$, $Li_7La_3Zr_2O_{12}$, $LiBO_3$, $Li_3PO_4$, $Li_3OX$ (X is F, Cl, Br, etc.) and $LiTi_2(PO_4)_3$.

In some embodiments of the present disclosure, the all-solid-state lithium-ion battery further comprises a substrate, wherein the positive electrode current collector is disposed on the substrate;

that is, the present disclosure can also provide an all-solid-state lithium-ion battery having a structure of a substrate, a positive electrode current collector (layer), a positive electrode material layer, a solid electrolyte (layer), a negative electrode material layer and a negative electrode current collector (layer) in the above order.

Since both the positive electrode and the negative electrode of the solid-state lithium-ion battery of the present disclosure are non-lithium materials, the solid-state lithium-ion battery of the present disclosure can be prepared on a non-high-temperature resistant substrate material such as paper and polymers, thereby obtaining a battery of novel materials, such as a unique all-solid-state paper battery.

In some preferred embodiments, the positive electrode material layer (manganese oxygen compound thin film) has a thickness of 50-5000 nm, which, for example, can be, but is not limited to, 100 nm, 200 nm, 500 nm, 1000 nm, 1500 nm, 2000 nm, 2500 nm, 3000 nm, 3500 nm, 4000 nm, etc.; preferably, being 400 nm;

the negative electrode material layer (titanium oxygen compound thin film) has a thickness of 50-5000 nm, which, for example, can be, but is not limited to, 100 nm, 200 nm, 500 nm, 1000 nm, 1500 nm, 2000 nm, 2500 nm, 3000 nm, 3500 nm, 4000 nm, etc.; preferably, being 300 nm;

the positive electrode current collector layer has a thickness of 10-200 nm, which, for example, can be, but is not limited to, 30 nm, 50 nm, 100 nm, 120 nm, 150 nm, 180 nm, etc.; preferably, being 40 nm;

the negative electrode current collector layer has a thickness of 10-200 nm, which, for example, can be, but is not limited to, 30 nm, 50 nm, 100 nm, 120 nm, 150 nm, 180 nm, etc.; preferably, being 40 nm; and the solid electrolyte thin film has a thickness of 200-5000 nm, which, for example, can be, but is not limited to, 300 nm, 500 nm, 1000 nm, 1500 nm, 2000 nm, 2500 nm, 3000 nm, 3500 nm, 4000 nm, etc.; preferably, being 2000 nm.

The thickness of the positive electrode material layer and/or the negative electrode material layer shall not be too large or too small, and a suitable thickness of the positive electrode material layer and/or the negative electrode material layer helps to improve the utilization rate of the positive and negative electrode materials, and optimize the cycle performance and the quick charging and discharging capability of the battery. The thickness of the solid electrolyte thin film shall not be too large or too small, and a suitable thickness of the solid electrolyte thin film is 2000 nm, which helps to reduce the short circuit rate of the battery, improve the yield rate of the preparation of the battery and ensure the quick charging and discharging capability of the battery.

In some preferred embodiments of the present disclosure, the material that can be used as the substrate is selected from a group consisting of metal, metal oxides, silicon, glass, paper and polymers;

preferably, the metal material includes: stainless steel and aluminum;

preferably, the metal oxide material includes: aluminum oxide; and preferably, the polymer material includes: polyimide.

In some embodiments of the present disclosure, the all-solid-state lithium-ion battery is a thin-film battery.

In a third aspect, the present disclosure provides a preparation method of the all-solid-state lithium-ion battery, comprising: combining a positive electrode, a solid electrolyte and a negative electrode in sequence to obtain an all-solid-state lithium-ion battery.

In some embodiments of the present disclosure, the preparation method of the all-solid-state lithium-ion battery comprises sequentially preparing a positive electrode material, a solid electrolyte, a negative electrode material and a negative electrode current collector on a surface of a positive electrode current collector to obtain the all-solid-state lithium-ion battery.

In some preferred embodiments of the present disclosure, in the preparation method of the all-solid-state lithium-ion battery, the positive electrode current collector, which serves as a base material layer, is disposed on the substrate;

wherein, preferably, the material that can be used as the substrate includes: one of metal, metal oxides, silicon, glass, paper and polymers, or a composite material of at least two of the above materials;

preferably, the metal material includes: stainless steel and aluminum;

preferably, the metal oxide material includes: aluminum oxide; and preferably, the polymer material includes: polyimide.

In some preferred embodiments of the present disclosure, the preparation method of the all-solid-state lithium-ion battery comprises sequentially preparing a manganese oxygen compound thin film, a solid electrolyte film, a titanium oxygen compound thin film and a negative electrode current collector thin film on a surface of a positive electrode current collector.

In some more preferred embodiments of the present disclosure, the preparation method of the manganese oxygen compound thin film comprises: magnetron sputtering, pulsed laser deposition, electrochemical deposition, chemical vapor deposition, or film coating;

preferably, the deposition comprises: magnetron sputtering.

In some more preferred embodiments of the present disclosure, the preparation method of the solid electrolyte thin film comprises: magnetron sputtering, pulse laser, or plasma assisted electron beam evaporation.

In some more preferred embodiments of the present disclosure, the preparation method of a titanium oxygen compound thin film comprises: magnetron sputtering or pulsed laser deposition.

In some more preferred embodiments of the present disclosure, the preparation method of the negative electrode current collector thin film comprises: magnetron sputtering.

In a fourth aspect, the present disclosure provides an electrical device that comprises the above all-solid-state lithium-ion battery and uses the all-solid-state lithium-ion battery as a power supply device.

In some embodiments of the present disclosure, the electrical device includes a microsensor, a smart card, an electronic tag, an integrated circuit, a wearable electronic device, a medical device, an equipment or device used in aerospace, etc.

The present disclosure will be described below in further detail in connection with the examples and comparative examples.

Example 1

An all-solid-state thin-film lithium-ion battery having a structure as shown in FIG. 1 was prepared according to the following method:

(1) Preparing a $Mn_3O_4$ thin film, i.e., a positive electrode material layer 2, on a glass substrate plated with platinum and titanium as a positive electrode current collector 1 by the method of direct current (DC) magnetron sputtering, with pure Mn metal as a target material.

The specific process was as follows: after installing the target material and the positive electrode current collector, closing the sputtering chamber, vacuumizing the sputtering chamber to $1.0 \times 10^{-4}$ Pa or below, introducing 100 sccm argon and 20 sccm oxygen into the sputtering chamber, setting the DC sputtering power to 1.4 W/cm$^2$ and the target-substrate distance to 80 mm, pre-sputtering for 5 min to remove the impurities from the surface of the target material, heating the substrate to 300° C. and sputtering for 3 h, i.e., preparing a $Mn_3O_4$ thin film on the positive electrode current collector phase, wherein the SEM image, XRD diagram, Raman diagram and XPS diagram of the prepared $Mn_3O_4$ thin film were as shown in FIG. 2, FIG. 3, FIG. 4 and FIG. 5, respectively.

(2) Preparing LiPON solid electrolyte thin film by means of magnetron sputtering on the basis of the obtained $Mn_3O_4$ thin film, thereby obtaining a solid electrolyte layer 3.

The specific process was as follows: using $Li_3PO_4$ as a target material, after installing the target material and the above prepared thin film, closing the sputtering chamber, vacuumizing the sputtering chamber to $1.0 \times 10^{-4}$ Pa or below, introducing 100 sccm nitrogen into the sputtering chamber, setting the radio frequency (RF) sputtering power to 1.4 W/cm$^2$ and the target-substrate distance to 80 mm, and sputtering for 12 h, thereby obtaining a solid electrolyte layer 3.

(3) Preparing a titanium dioxide thin film, i.e., a negative electrode material layer 4, by means of magnetron sputtering on the basis of the LiPON solid electrolyte thin film.

The specific process was as follows: using pure Ti metal as a target material, after installing the target material and the above prepared thin film, closing the sputtering chamber, vacuumizing the sputtering chamber to $1.0 \times 10^{-4}$ Pa or below, introducing 60 sccm argon and 10 sccm oxygen into the sputtering chamber, setting the DC sputtering power to 2 W/cm$^2$ and the target-substrate distance to 80 mm, and sputtering for 12 h, thereby obtaining a weakly crystallized $TiO_2$ thin film.

Figure 7:
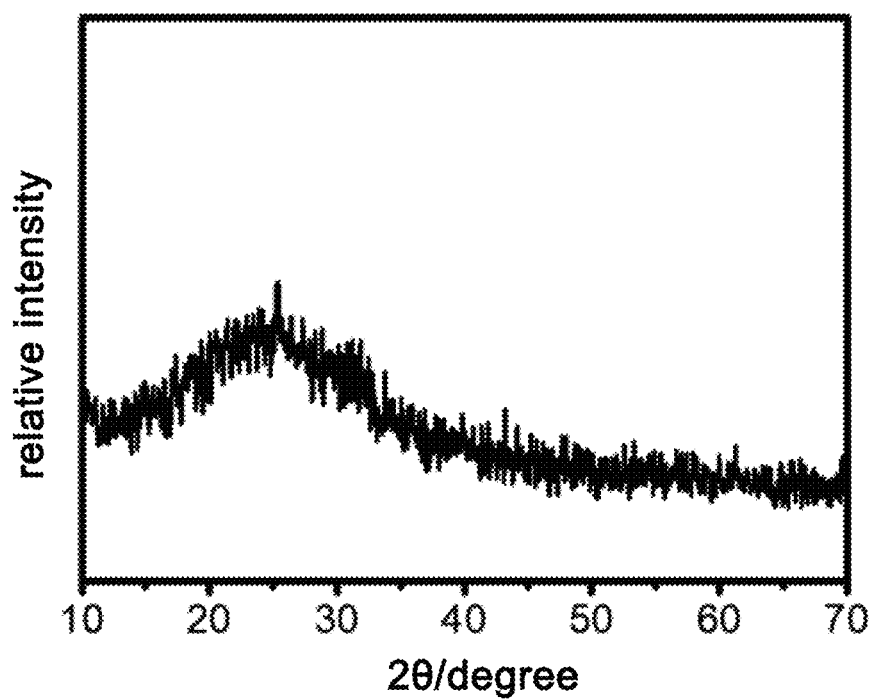
FIG. 7 is an XRD diagram of the $TiO_2$ thin film prepared in Example 1 of the present disclosure.
Figure 8:
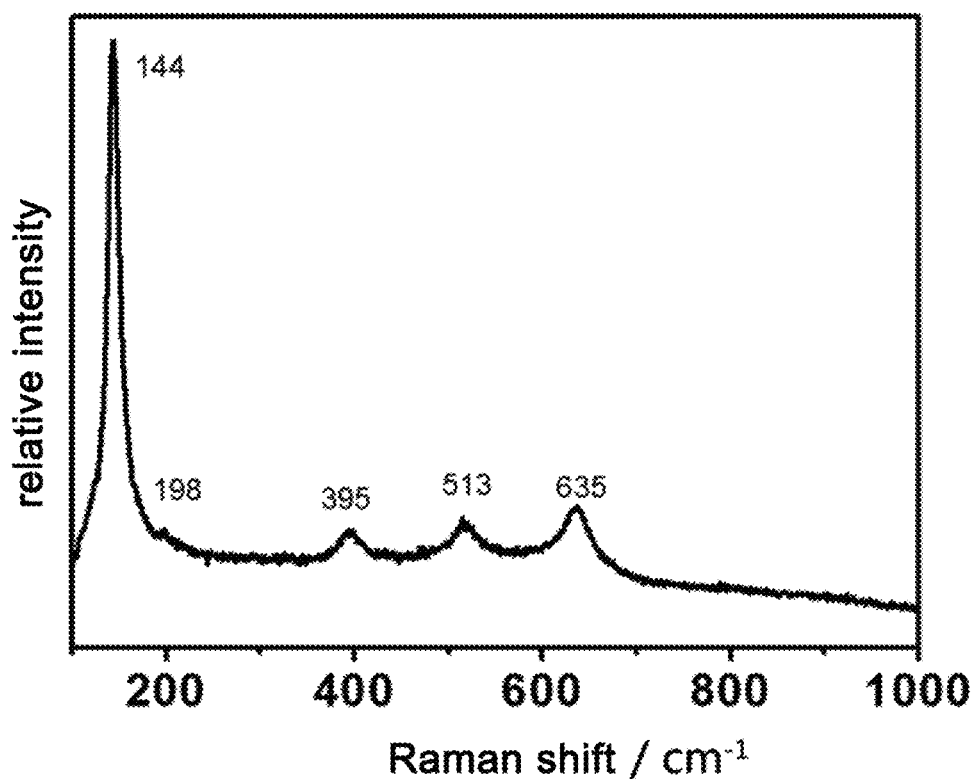
FIG. 8 is a Raman diagram of the $TiO_2$ thin film prepared in Example 1 of the present disclosure.

The SEM image, XRD diagram and Raman diagram of the prepared $TiO_2$ thin film were as shown in FIG. 6, FIG. 7 and FIG. 8, respectively.

(4) Preparing a negative electrode current collector thin film, i.e., a negative electrode current collector 5, combined with the titanium dioxide thin film on the basis of the titanium dioxide thin film by magnetron sputtering, with Pt and Ti as target materials.

The specific process was as follows: using pure Ti metal as a target material, after installing the target material and the above prepared thin film, closing the sputtering chamber, vacuumizing the sputtering chamber to $1.0 \times 10^{-4}$ Pa or below, introducing 60 sccm argon into the sputtering chamber, setting the DC sputtering power to 0.5 W/cm$^2$ and the target-substrate distance to 80 mm, and sputtering for 10 min, thereby obtaining a metal Ti thin film.

Thereafter, the pure Pt metal was used as the target material, after the target material and the above prepared thin film were installed, the sputtering chamber was closed and vacuumized to $1.0 \times 10^{-4}$ Pa or below, 60 sccm argon was introduced into the sputtering chamber, the DC sputtering power was set to 1 W/cm$^2$ and the target-substrate distance was set to 80 mm, and sputtering was performed for 5 min to obtain a metal Pt thin film. The final Pt/Ti constituted a negative electrode current collector 5.

Figure 9:
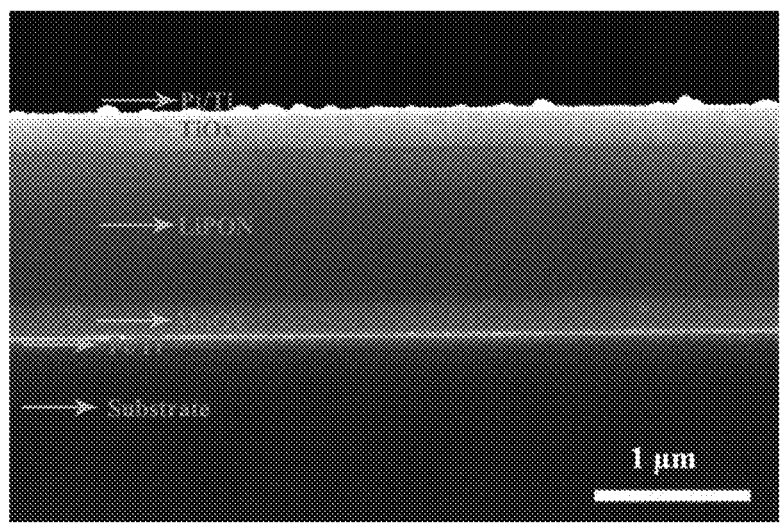
FIG. 9 is an SEM image of a section of the all-solid-state thin-film lithium-ion battery prepared in Example 1 of the present disclosure.

The SEM image of a section of the all-solid-state thin-film lithium-ion battery of Example 1 prepared by the above steps (1)-(4) was as shown in FIG. 9.

The obtained all-solid-state thin-film lithium-ion battery was then packaged to obtain a usable all-solid-state thin-film lithium-ion battery whose positive and negative electrodes do not contain lithium.

The electrochemical performance detection results of the $Mn_3O_4$/LiPON/$TiO_2$ all-solid-state thin-film lithium-ion battery prepared in Example 1 were shown in FIG. 10. As could be seen from FIG. 10, the all-solid-state thin-film lithium-ion battery of Example 1 could obtain a specific capacity of 96 mAh/g at room temperature at an operating voltage of 0 V-3.5 V and a current of 25 mA/g, and had an extremely high cycling stability (substantially no attenuation after 2000 cycles). Moreover, the all-solid-state thin-film lithium-ion battery could also operate at an ultra-high temperature, and could exhibit a high specific capacity of 195 mAh/g at a high temperature of 300° C. at a current of 25 mA/g, and experienced nearly no capacity attenuation after 200 cycles at a high temperature of 240° C., exhibiting excellent high-temperature cycling stability.

Example 2

An all-solid-state thin-film lithium-ion battery was prepared according to the following method:

(1) Preparing a $MnO_x$ amorphous thin film on paper plated with platinum and titanium as a positive electrode current collector by the method of DC magnetron sputtering, with pure Mn metal as a target material.

The specific process was as follows: after installing the target material and the positive electrode current collector, closing the sputtering chamber, vacuumizing the sputtering chamber to $1.0 \times 10^{-4}$ Pa or below, introducing 40 sccm argon and 10 sccm oxygen into the sputtering chamber, and then adjusting the gas pressure in the chamber to 1 Pa; setting the DC sputtering power to 1.4 W/cm$^2$ and the target-substrate distance to 80 mm, pre-sputtering for 5 min, and sputtering at room temperature for 3 h, thereby obtaining an amorphous manganese oxygen compound thin film on the positive electrode current collector, wherein it was detected that the formed manganese oxygen compound thin film was a $Mn_3O_4$ and $MnO_2$ composite thin film, which is referred to as a $MnO_x$ amorphous thin film (wherein x is 1.33-2).

Figure 12:
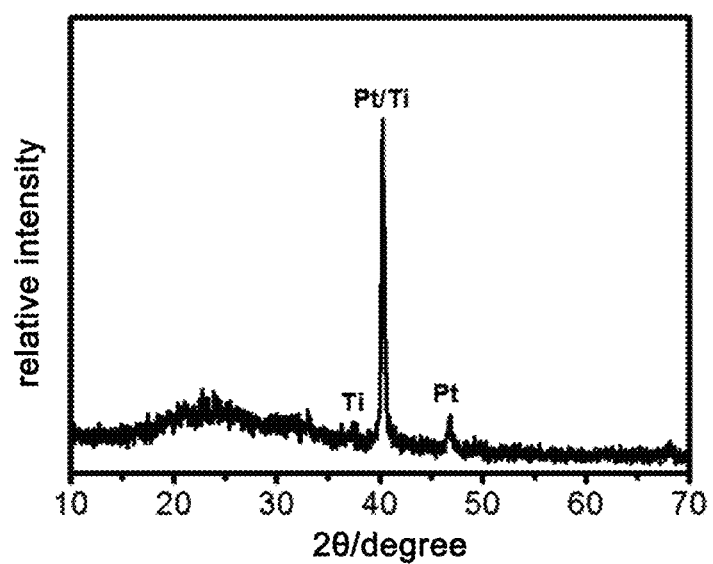
FIG. 12 is an XRD diagram of the $MnO_x$ amorphous thin film prepared in Example 2 of the present disclosure.

The SEM image and XRD diagram of the prepared $MnO_x$ amorphous thin film were as shown in FIGS. 11 and 12, respectively.

(2) Preparing LiPON solid electrolyte thin film by means of magnetron sputtering on the basis of the obtained amorphous $MnO_x$ thin film.

The specific process was as follows: using $Li_3PO_4$ as a target material, after installing the target material and the above prepared thin film, closing the sputtering chamber, vacuumizing the sputtering chamber to $1.0 \times 10^{-4}$ Pa or below, introducing 100 sccm nitrogen into the sputtering chamber, setting the RF sputtering power to 1.4 $W/cm^2$ and the target-substrate distance to 80 mm, and sputtering for 12 h, thereby obtaining a solid electrolyte layer 3.

(3) Preparing a titanium dioxide thin film on the basis of the LiPON solid electrolyte thin film by means of magnetron sputtering, with $TiO_2$ target as a target material.

The specific process was as follows: after installing the target material and the above prepared thin film, closing the sputtering chamber, vacuumizing the sputtering chamber to $1.0 \times 10^{-4}$ Pa or below, introducing 100 sccm argon into the sputtering chamber, setting the RF sputtering power to 2 $W/cm^2$ and the target-substrate distance to 80 mm, and sputtering for 12 h, thereby obtaining an amorphous $TiO_2$ thin film.

(4) Preparing a negative electrode current collector thin film combined with the titanium dioxide thin film on the basis of the titanium dioxide thin film by magnetron sputtering, with Pt and Ti as target materials.

The specific process was as follows: using pure Ti metal as a target material, after installing the target material and the above prepared thin film, closing the sputtering chamber, vacuumizing the sputtering chamber to $1.0 \times 10^{-4}$ Pa or below, introducing 60 sccm argon into the sputtering chamber, setting the DC sputtering power to 0.5 $W/cm^2$ and the target-substrate distance to 80 mm, and sputtering for 10 min, thereby obtaining a metal Ti thin film.

Thereafter, the pure Pt metal was used as the target material, after the target material and the above prepared thin film were installed, the sputtering chamber was closed and vacuumized to $1.0 \times 10^{-4}$ Pa or below, 60 sccm argon was introduced into the sputtering chamber, the DC sputtering power was set to 1 $W/cm^2$ and the target-substrate distance was set to 80 mm, and sputtering was performed for 5 min to obtain a metal Pt thin film. The final Pt/Ti constituted a negative electrode current collector 5.

Figure 13:
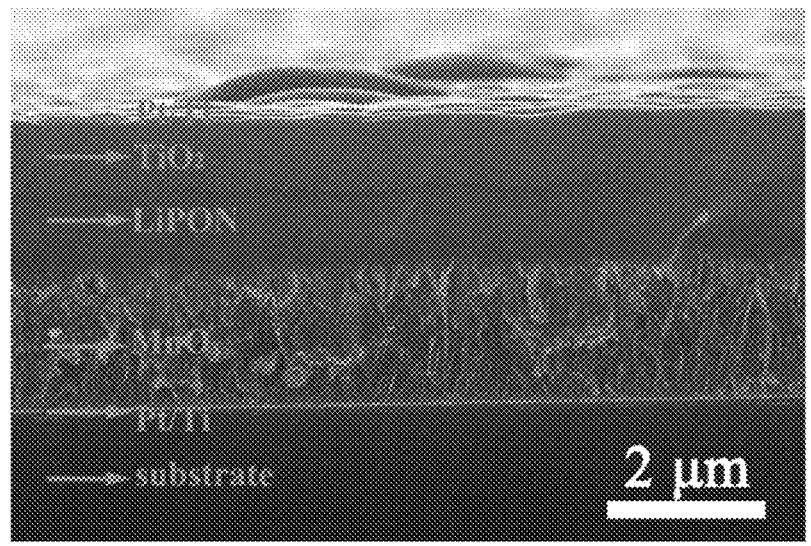
FIG. 13 is an SEM image of a section of a $MnO_x$/LiPON/$TiO_2$ all-solid-state thin-film lithium-ion battery prepared in Example 2 of the present disclosure.

The SEM image of a section of the all-solid-state thin-film lithium-ion battery of Example 2 prepared by the above steps (1)-(4) was as shown in FIG. 13.

Figure 14:
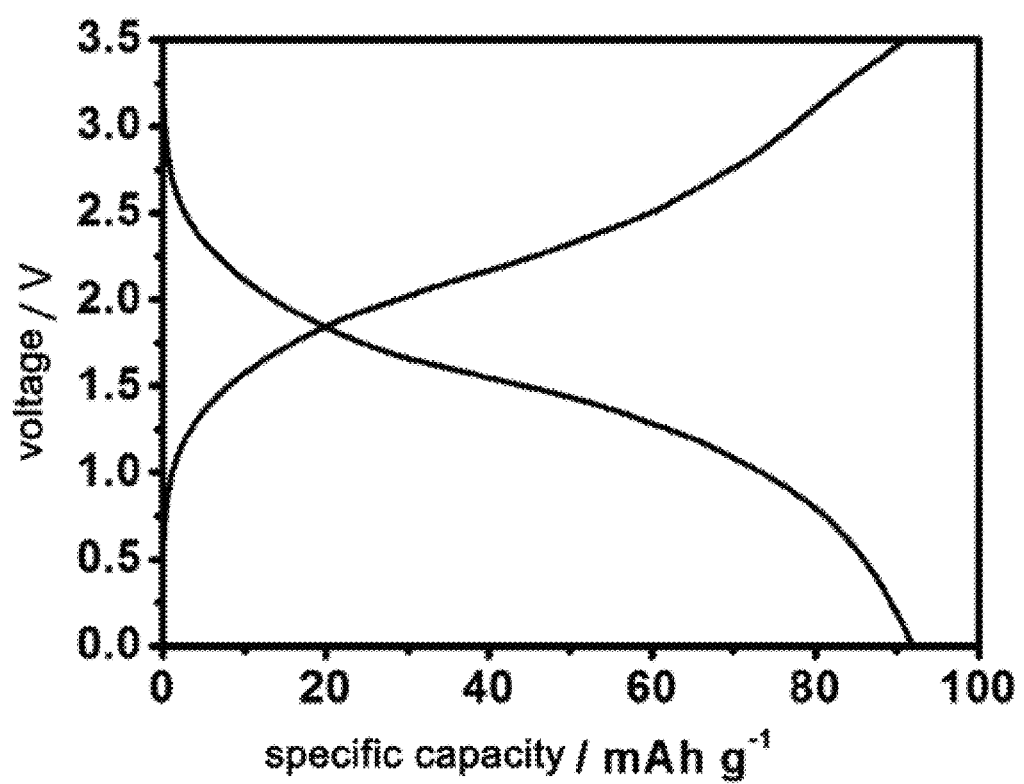
FIG. 14 is an electrochemical performance detection diagram of the $MnO_x$/LiPON/$TiO_2$ all-solid-state thin-film lithium-ion battery prepared in Example 2 of the present disclosure.

The obtained all-solid-state thin-film lithium-ion battery was then packaged to obtain a usable all-solid-state thin-film lithium-ion battery whose positive and negative electrodes do not contain lithium. The electrochemical performance detection results of the prepared $MnO_x$/LiPON/$TiO_2$ all-solid-state thin-film lithium-ion battery were shown in FIG. 14. As could be seen from FIG. 14, the all-solid-state thin-film lithium-ion battery of Example 2 could obtain a specific capacity of 93 mAh/g at room temperature at an operating voltage of 0 V-3.5 V and a current of 25 mA/g.

Example 3

An all-solid-state thin-film lithium-ion battery was prepared, for example, according to the following method:

(1) Preparing a $MnO_x$ amorphous thin film on a polyimide thin film substrate plated with platinum and titanium as a positive electrode current collector by the method of RF magnetron sputtering, with $MnO_2$ target as a target material.

The specific process was as follows: after installing the target material and the positive electrode current collector, closing the sputtering chamber, vacuumizing the sputtering chamber to $1.0 \times 10^{-4}$ Pa or below, introducing 100 sccm argon and 20 sccm oxygen into the sputtering chamber, and then adjusting the gas pressure in the chamber to 1 Pa; setting the sputtering power to 1.4 $W/cm^2$ and the target-substrate distance to 80 mm, and sputtering at room temperature for 3 h, thereby obtaining a $MnO_x$ thin film combined with the positive electrode current collector.

(2) Preparing LiPON solid electrolyte thin film by means of magnetron sputtering on the basis of the obtained amorphous $MnO_x$ thin film.

The specific process was, for example, as follows:

after installing the target material and the above prepared thin film, closing the sputtering chamber, vacuumizing the sputtering chamber to $1.0 \times 10^{-4}$ Pa or below, introducing 100 sccm argon into the sputtering chamber, setting the RF sputtering power to 2 $W/cm^2$ and the target-substrate distance to 80 mm, and sputtering for 12 h, thereby obtaining an amorphous $TiO_2$ thin film.

(3) Preparing a titanium dioxide thin film on the basis of the LiPON solid electrolyte thin film by means of magnetron sputtering, with pure Ti metal as a target material.

The specific process was as follows: after installing the target material and the above prepared thin film, closing the sputtering chamber, vacuumizing the sputtering chamber to $1.0 \times 10^{-4}$ Pa or below, introducing 100 sccm argon into the sputtering chamber, setting the DC sputtering power to 2 $W/cm^2$ and the target-substrate distance to 80 mm, and sputtering for 12 h, thereby obtaining a weakly crystallized $TiO_2$ thin film.

(4) Preparing a negative electrode current collector thin film combined with the titanium dioxide thin film on the basis of the titanium dioxide thin film by magnetron sputtering, with Pt and Ti as target materials.

Pure Ti metal was used as a target material, after the target material and the above prepared thin film were installed, the sputtering chamber was closed and vacuumized to $1.0 \times 10^{-4}$ Pa or below, 60 sccm argon was introduced into the sputtering chamber, the DC sputtering power was set to 0.5 $W/cm^2$ and the target-substrate distance was set to 80 mm, and sputtering was performed for 10 min, thereby obtaining a metal Ti thin film.

Thereafter, the pure Pt metal was used as the target material, after the target material and the above prepared thin film were installed, the sputtering chamber was closed and vacuumized to $1.0 \times 10^{-4}$ Pa or below, 60 sccm argon was introduced into the sputtering chamber, the DC sputtering power was set to 1 $W/cm^2$ and the target-substrate distance was set to 80 mm, and sputtering was performed for 5 min to obtain a metal Pt thin film. The final Pt/Ti constituted a negative electrode current collector 5.

The obtained all-solid-state thin-film lithium-ion battery was then packaged to obtain a usable all-solid-state thin-film lithium-ion battery whose positive and negative electrodes do not contain lithium.

Figure 15:
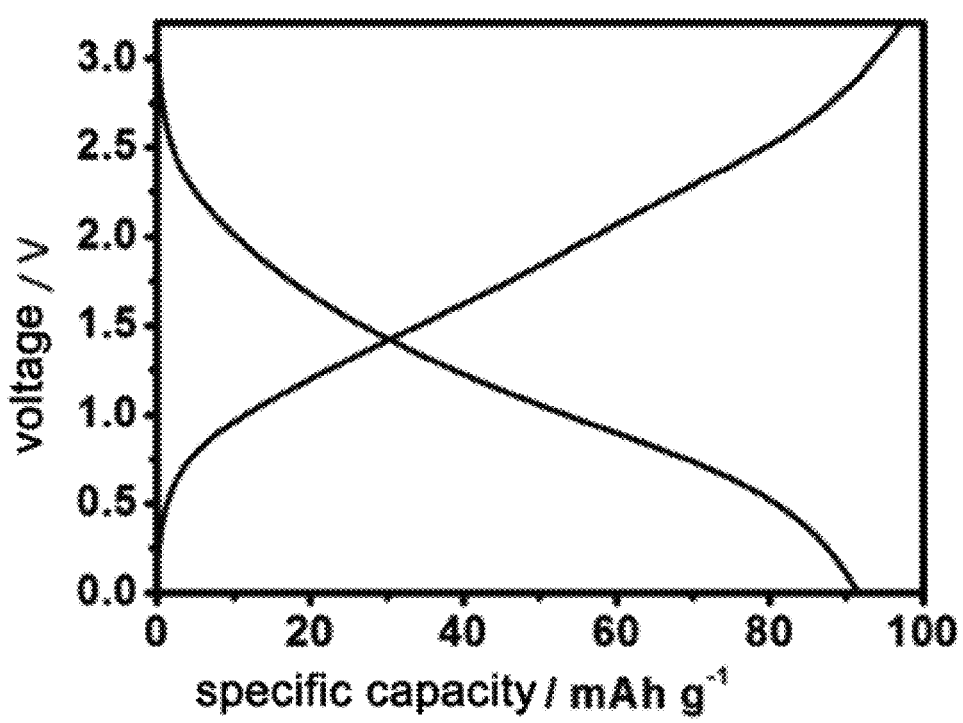
FIG. 15 is an electrochemical performance detection diagram of an all-solid-state thin-film lithium-ion battery prepared in Example 3 of the present disclosure.

The electrochemical performance detection results of the prepared $MnO_x$/LiPON/$TiO_2$ all-solid-state thin-film lithium-ion battery were shown in FIG. 15. As could be seen from FIG. 15, the all-solid-state thin-film lithium-ion battery of Example 3 could obtain a specific capacity of 92 mAh/g at room temperature at an operating voltage of 0 V-3.5 V and a current of 25 mA/g.

Example 4

(1) Using a gold-plated stainless steel foil as a working electrode, a platinum sheet as a counter electrode, Ag/AgCl as a reference electrode, and a mixed solution of 0.1 M manganese acetate and 0.1 M sodium sulfate as an electrolyte, and performing electrodeposition for 15 min at constant current of −1.4 V to prepare a $Mn_3O_4$ thin film directly on the gold-plated stainless steel foil.

(2) Preparing LiSiON amorphous solid electrolyte thin film by means of magnetron sputtering on the basis of the $Mn_3O_4$ thin film.

The specific process was as follows: using $Li_2SiO_3$ as a target material, after installing the target material and the above prepared thin film, closing the sputtering chamber, vacuumizing the sputtering chamber to $1.0 \times 10^{-4}$ Pa or below, introducing 90 sccm nitrogen and 10 sccm oxygen into the sputtering chamber, setting the RF sputtering power to 1.4 W/cm$^2$ and the target-substrate distance to 80 mm, and sputtering for 12 h, thereby obtaining a solid electrolyte layer 3.

(3) Preparing a titanium dioxide thin film on the basis of the LiSiON solid electrolyte thin film, with pure Ti metal as a target material.

The specific process was as follows: after installing the target material and the above prepared thin film, closing the sputtering chamber, vacuumizing the sputtering chamber to $1.0 \times 10^{-4}$ Pa or below, introducing 100 sccm argon into the sputtering chamber, setting the DC sputtering power to 2 W/cm$^2$ and the target-substrate distance to 80 mm, and sputtering for 12 h, thereby obtaining a weakly crystallized $TiO_2$ thin film.

(4) Preparing a negative electrode current collector thin film combined with the titanium dioxide thin film on the basis of the titanium dioxide thin film by magnetron sputtering, with Pt and Ti as target materials.

The specific process was as follows: using pure Ti metal as a target material, after installing the target material and the above prepared thin film, closing the sputtering chamber, vacuumizing the sputtering chamber to $1.0 \times 10^{-4}$ Pa or below, introducing 60 sccm argon into the sputtering chamber, setting the DC sputtering power to 0.5 W/cm$^2$ and the target-substrate distance to 80 mm, and sputtering for 10 min, thereby obtaining a metal Ti thin film.

Thereafter, the pure Pt metal was used as the target material, after the target material and the above prepared thin film were installed, the sputtering chamber was closed and vacuumized to $1.0 \times 10^{-4}$ Pa or below, 60 sccm argon was introduced into the sputtering chamber, the DC sputtering power was set to 1 W/cm$^2$ and the target-substrate distance was set to 80 mm, and sputtering was performed for 5 min to obtain a metal Pt thin film. The final Pt/Ti constituted a negative electrode current collector 5.

The obtained all-solid-state thin-film lithium-ion battery was then packaged to obtain a usable all-solid-state thin-film lithium-ion battery whose positive and negative electrodes do not contain lithium.

Example 5

(1) Using the method of pulsed laser deposition, using pure Mn metal target as a target material and stainless steel as a positive electrode current collector, using a KrF excimer laser, with a laser wavelength of 248 nm and with the laser energy and density controlled to 2 J/cm$^2$ and 10 Hz, respectively, setting the target-substrate distance to 4 cm and the oxygen partial pressure to 26.6 Pa, heating the substrate to 400° C. and sputtering for 40 min, to prepare a $MnO_x$ thin film directly on a stainless steel foil.

(2) Preparing $Li_7La_3Zr_2O_{12}$ amorphous solid electrolyte thin film on the basis of the $MnO_x$ thin film by means of magnetron sputtering, with a $Li_7La_3Zr_2O_{12}$ target as a target material.

The specific process was as follows: after installing the target material and the above prepared thin film, closing the sputtering chamber, vacuumizing the sputtering chamber to $1.0 \times 10^{-4}$ Pa or below, introducing 50 sccm argon into the sputtering chamber, setting the DC sputtering power to 1 W/cm$^2$ and the target-substrate distance to 80 mm, and sputtering for 12 h, thereby obtaining an amorphous $Li_7La_3Zr_2O_{12}$ thin film.

(3) Preparing a titanium dioxide thin film on the $Li_7La_3Zr_2O_{12}$ solid electrolyte thin film by pulsed laser deposition, with $TiO_2$ as a target material.

The specific process was as follows: using the KrF excimer laser, with a laser wavelength of 248 nm and with the laser energy and density controlled to 3 J/cm$^2$ and 10 Hz, respectively, and setting the target-substrate distance to 4 cm and the oxygen partial pressure to 26.6 Pa, to prepare an amorphous $TiO_2$ negative electrode thin film directly on the above $Li_7La_3Zr_2O_{12}$ electrolyte thin film.

(4) Preparing a negative electrode current collector thin film combined with the titanium dioxide thin film on the basis of the titanium dioxide thin film by magnetron sputtering, with Pt and Ti as target materials.

The specific process was as follows: using pure Ti metal as a target material, after installing the target material and the above prepared thin film, closing the sputtering chamber, vacuumizing the sputtering chamber to $1.0 \times 10^{-4}$ Pa or below, introducing 60 sccm argon into the sputtering chamber, setting the DC sputtering power to 0.5 W/cm$^2$ and the target-substrate distance to 80 mm, and sputtering for 10 min, thereby obtaining a metal Ti thin film.

Thereafter, the pure Pt metal was used as the target material, after the target material and the above prepared thin film were installed, the sputtering chamber was closed and vacuumized to $1.0 \times 10^{-4}$ Pa or below, 60 sccm argon was introduced into the sputtering chamber, the DC sputtering power was set to 1 W/cm$^2$ and the target-substrate distance was set to 80 mm, and sputtering was performed for 5 min to obtain a metal Pt thin film. The final Pt/Ti constituted a negative electrode current collector 5.

The obtained all-solid-state thin-film lithium-ion battery was then packaged to obtain a usable all-solid-state thin-film lithium-ion battery whose positive and negative electrodes do not contain lithium.

Comparative Example 1

A $Mn_3O_4$ thin film and a LiPON solid electrolyte thin film were sequentially prepared on a glass substrate plated with platinum and titanium as the positive electrode current collector 1 according to the methods of steps 1) and 2) in Example 1;

then, lithium metal was evaporated on the LiPON solid electrolyte thin film using a thermal evaporation device to form a negative electrode active material thin film, and finally a negative electrode current collector thin film was obtained by magnetron sputtering using Pt and Ti as target materials, to obtain an all-solid-state thin-film lithium-ion battery having a Mn$_3$O$_4$/LiPON/Li structure.

The electrochemical performance detection results of the all-solid-state thin-film lithium-ion battery prepared in Comparative Example 1 were shown in FIG. 16. The battery could achieve a specific capacity of 205 mAh/g at a current density of 50 mA/g, and the capacity thereof was maintained at 84% after 1500 cycles. However, lithium metal was directly used as the negative electrode. Lithium metal needs to be prepared in a glove box or in a high-level ultra-clean room in order to be stored. Thus, the preparation requirements and costs were relatively high. In addition, since the melting point of lithium metal is 180° C., the battery can hardly be used in a high temperature range above 180° C.

Comparative Example 2

1) A titanium dioxide thin film was prepared on a glass substrate plated with platinum and titanium as a positive electrode current collector, by a method of DC magnetron sputtering, with pure Ti metal as a target material according to the method in step 3) in Example 1.

2) On the basis of the obtained titanium dioxide thin film, a LiPON solid electrolyte thin film was prepared by means of magnetron sputtering using the method in step 2) in Example 1.

3) On the basis of the LiPON solid electrolyte thin film, lithium metal was evaporated on the LiPON solid electrolyte thin film by using a thermal evaporation device to form a negative electrode active material thin film.

4) A negative electrode current collector thin film was obtained by magnetron sputtering, with Pt and Ti as target materials, so as to obtain an all-solid-state thin-film lithium-ion battery having a TiO$_2$/LiPON/Li structure.

The electrochemical performance of the all-solid-state thin-film lithium-ion battery prepared in Comparative Example 2 was shown in FIG. 17. The battery could achieve a specific capacity of 202 mAh/g at a current density of 50 mA/g, and experienced substantially no capacity attenuation after 2000 cycles. However, lithium metal was directly used as the negative electrode. Lithium metal needs to be prepared in a glove box or in a high-level ultra-clean room in order to be stored. Thus, the preparation requirements and costs were relatively high. In addition, since the melting point of lithium metal is 180° C., the battery can hardly be used in a high temperature range above 180° C.

Comparative Example 3

An existing all-solid-state lithium-ion battery, comprising a positive electrode current collector layer, a positive electrode material layer, a lithium-containing solid electrolyte, a negative electrode material layer and a negative electrode current collector layer which are sequentially stacked, wherein the positive electrode current collector layer is stainless steel, the positive electrode material layer is LiCoO$_2$, the lithium-containing solid electrolyte is LiPON, the negative electrode material layer is lithium metal, and the negative electrode current collector layer is copper.

1) With a lithium cobalt oxide (LiCoO$_2$) target as a target material and polyimide as a substrate material, Pt/Ti was plated on the substrate as a positive electrode current collector by RF magnetron sputtering. After the target material and the positive electrode current collector were installed, the sputtering chamber was closed and vacuumized to $1.0 \times 10^{-4}$ Pa or below, 100 sccm argon and 20 sccm oxygen were introduced into the sputtering chamber, and then the gas pressure in the chamber was adjusted to 1 Pa; the substrate was heated to 300° C., the RF sputtering power density was set to 1.4 W/cm$^2$ and the target-substrate distance was set to 80 mm, pre-sputtering was performed for 5 min to remove the impurities from the surface of the target material, and sputtering was performed at room temperature for 3 h, thereby obtaining a lithium cobalt oxide thin film directly on the above substrate.

2) Preparation of solid electrolyte thin film: LiPON solid electrolyte thin film was prepared by means of magnetron sputtering using the method in step 2) in Example 1.

3) A layer of metal Li film was plated on the surface of the obtained LiPON solid electrolyte thin film by thermal evaporation.

4) A negative electrode current collector thin film was obtained by magnetron sputtering using Pt and Ti as target materials, so as to obtain an all-solid-state thin-film lithium-ion battery having a LiCoO$_2$/LiPON/Li structure.

Figure 18:
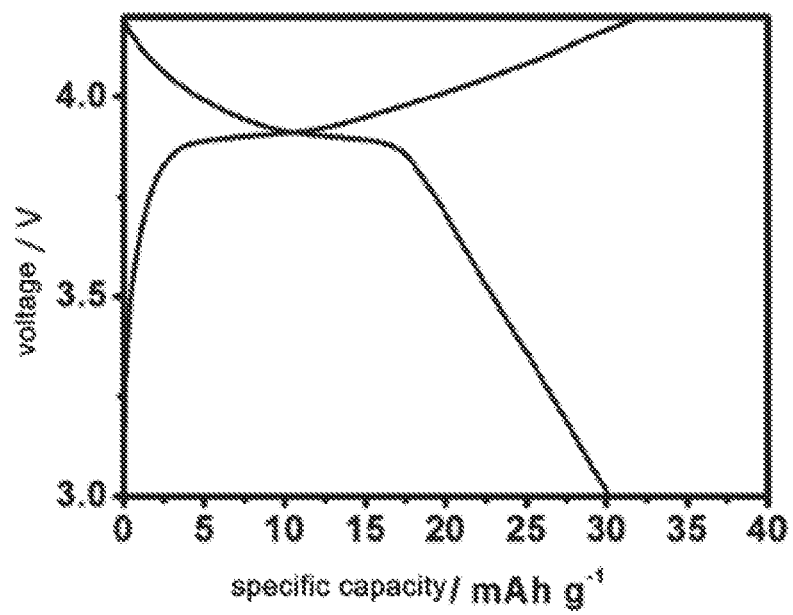
FIG. 18 is an electrochemical performance diagram of an all-solid-state thin-film lithium-ion battery prepared in Comparative Example 3 of the present disclosure.

For the all-solid-state thin-film lithium-ion battery, since the highest temperature that polyimide can withstand is 300° C., the heating temperature was set to 300° C. However, the sputtering temperature of LiCoO$_2$ was 300° C., and was not subjected to a heating treatment, and the crystallinity thereof was limited. As shown in FIG. 18 which is the electrochemical performance diagram thereof, the specific capacity is about 30 mAh/g at the current of 25 mA/g within an operating voltage of 3 V-4.2 V. If the heating treatment temperature is increased, the substrate will be easily deformed by heat, and then decomposed to fail. In addition, lithium metal needs to be prepared in a glove box or in a high-level ultra-clean room in order to be stored. Furthermore, since the melting point of lithium metal is 180° C., the battery can hardly be used in a high temperature range above 180° C.

INDUSTRIAL APPLICABILITY

In the all-solid-state lithium-ion battery provided by the present disclosure, neither the positive electrode nor the negative electrode contains a lithium compound or lithium metal, and since both the manganese oxygen compound and the titanium oxygen compound can be prepared at room temperature or at a relatively low temperature, the requirements of the all-solid-state lithium-ion battery of the present disclosure for the preparation environment conditions are greatly reduced, which can also be matched with the semiconductor process, and the integration of the solid-state battery on a microcircuit can be realized. In addition, the battery design can have excellent high temperature performance (up to 300° C.), and can be applied to special high temperature occasions, such as mines, aerospace, high temperature wells, etc.

The invention claimed is:

1. A positive electrode of a lithium-ion battery, comprising a positive electrode current collector and a positive electrode material layer provided on a surface of the positive electrode current collector, wherein a positive electrode active material in the positive electrode material layer is a manganese oxygen compound, wherein the manganese oxygen compound is a complex of manganese dioxide and manganous-manganic oxide.

2. The positive electrode of lithium-ion battery according to claim 1, wherein the positive electrode material layer is a manganese oxygen compound thin film, the manganese oxygen compound thin film has a thickness of 50-5000 nm.

3. An all-solid-state lithium-ion battery, comprising a positive electrode, a solid electrolyte and a negative electrode,
wherein the positive electrode comprises a positive electrode current collector and a positive electrode material layer provided on a surface of the positive electrode current collector, a positive electrode active material in the positive electrode material layer is a manganese oxygen compound, wherein the manganese oxygen compound is a complex of manganese dioxide and manganous-manganic oxide;
the negative electrode comprises a negative electrode current collector and a negative electrode material layer provided on a surface of the negative electrode current collector, a negative electrode active material in the negative electrode material layer is a titanium oxygen compound.

4. The all-solid-state lithium-ion battery according to claim 3, wherein the positive electrode material layer is a manganese oxygen compound thin film, the manganese oxygen compound thin film has a thickness of 50-5000 nm.

5. The all-solid-state lithium-ion battery according to claim 3, wherein the negative electrode material layer is a titanium oxygen compound thin film, the titanium oxygen compound thin film has a thickness of 50-5000 nm.

6. The all-solid-state lithium-ion battery according to claim 3, wherein the solid electrolyte is a lithium-containing compound.

7. The all-solid-state lithium-ion battery according to claim 5, wherein the solid electrolyte is selected from the group consisting of LiPON, LiSiON, $Li_2SiO_3$, $Li_7La_3Zr_2O_{12}$, $LiBO_3$, $Li_3PO_4$, $Li_3OX$ and $LiTi_2(PO_4)_3$, wherein X is a halogen.

8. The all-solid-state lithium-ion battery according to claim 3, wherein the all-solid-state lithium-ion battery further comprises a substrate, wherein the positive electrode current collector is disposed on the substrate.

9. The all-solid-state lithium-ion battery according to claim 8, wherein a material of the substrate is selected from the group consisting of a metal material, a metal oxide material, a silicon material, a glass material, a paper material and a polymer material.

10. The all-solid-state lithium-ion battery according to claim 3, wherein the all-solid-state lithium-ion battery is a thin-film battery.

11. A preparation method of the all-solid-state lithium-ion battery according to claim 3, wherein the preparation method comprises: combining the positive electrode, the solid electrolyte and the negative electrode in sequence to obtain the all-solid-state lithium-ion battery.

12. The preparation method according to claim 11, comprising sequentially preparing the positive electrode material layer, the solid electrolyte, the negative electrode material layer and the negative electrode current collector on a surface of the positive electrode current collector to obtain the all-solid-state lithium-ion battery.

13. The preparation method according to claim 12, wherein the positive electrode current collector is disposed on a substrate.

14. The preparation method according to claim 12, comprising sequentially preparing a manganese oxygen compound thin film, a solid electrolyte film, a titanium oxygen compound thin film and a negative electrode current collector thin film on a surface of the positive electrode current collector, wherein the manganese oxygen compound thin film has a thickness of 50-5000 nm, and the titanium oxygen compound thin film has a thickness of 50-5000 nm.

15. The all-solid-state lithium-ion battery according to claim 3, wherein the titanium oxygen compound comprises titanium dioxide.

16. The all-solid-state lithium-ion battery according to claim 7, wherein X is fluorine, chlorine or bromine.

17. The preparation method according to claim 13, wherein the material of the substrate is one selected from the group consisting of a metal material, a metal oxide material, a silicon material, a glass material, a paper material and a polymer material or a composite material of at least two therefrom.

* * * * *